United States Patent
Hoel et al.

(10) Patent No.: US 9,849,910 B2
(45) Date of Patent: Dec. 26, 2017

(54) METHOD FOR DETERMINING A MAXIMUM SPEED LIMIT FOR A REVERSING VEHICLE COMBINATION

(71) Applicant: VOLVO TRUCK CORPORATION, Göteborg (SE)

(72) Inventors: Carl-Johan Hoel, Göteborg (SE); Kristoffer Tagesson, Göteborg (SE)

(73) Assignee: Volvo Truck Corporation, Göteborg (SE)

( * ) Notice: Subject to any disclaimer, the term of this patent is extended or adjusted under 35 U.S.C. 154(b) by 0 days.

(21) Appl. No.: 14/648,749

(22) PCT Filed: Dec. 10, 2012

(86) PCT No.: PCT/SE2012/000199
§ 371 (c)(1),
(2) Date: Jun. 1, 2015

(87) PCT Pub. No.: WO2014/092611
PCT Pub. Date: Jun. 19, 2014

(65) Prior Publication Data
US 2015/0298738 A1    Oct. 22, 2015

(51) Int. Cl.
*B62D 13/06*      (2006.01)
*B62D 15/02*      (2006.01)
*B60W 30/00*      (2006.01)

(52) U.S. Cl.
CPC ............. *B62D 13/06* (2013.01); *B60W 30/00* (2013.01); *B62D 15/0295* (2013.01)

(58) Field of Classification Search
CPC .... B62D 13/06; B62D 15/0295; B60W 30/00
(Continued)

(56) References Cited

U.S. PATENT DOCUMENTS

| | | | | |
|---|---|---|---|---|
| 4,240,515 A | * | 12/1980 | Kirkwood | B60K 17/10 180/165 |
| 2008/0281489 A1 | * | 11/2008 | Le Vourch | B62D 7/159 701/41 |

(Continued)

FOREIGN PATENT DOCUMENTS

| | | |
|---|---|---|
| DE | 10030449 A1 | 1/2001 |
| DE | 102006045196 A1 | 9/2006 |

(Continued)

OTHER PUBLICATIONS

International Search Report (Aug. 22, 2013) for corresponding International App. PCT/SE2012/000199.

(Continued)

*Primary Examiner* — Redhwan K Mawari
*Assistant Examiner* — Rodney P King
(74) *Attorney, Agent, or Firm* — WRB-IP LLP

(57) ABSTRACT

A method is provided for determining a maximum speed limit for a reversing vehicle combination that includes a towing vehicle and at least one towed trailer. The method includes determining a maneuver that is to be performed by the vehicle combination, simulating the complete maneuver in advance by using a control algorithm and a state space model, thereby obtaining the steering behavior of the vehicle combination during the maneuver, and calculating the maximum speed limit for the vehicle combination during the maneuver by using at least one predefined limiting condition. A maximum speed limit for a reverse assistance function can be estimated in advance, which allows for a faster and more efficient reversing of the vehicle combination, and at the same time allows for an improved comfort for the driver.

14 Claims, 2 Drawing Sheets

(58) Field of Classification Search
USPC .................................................. 701/41, 42
See application file for complete search history.

(56) References Cited

U.S. PATENT DOCUMENTS

| 2009/0254259 | A1* | 10/2009 | The | ..................... | G01S 19/52 |
|---|---|---|---|---|---|
| | | | | | 701/70 |
| 2011/0004375 | A1 | 1/2011 | Hueger et al. | | |
| 2012/0271515 | A1 | 10/2012 | Rhode et al. | | |
| 2014/0343795 | A1* | 11/2014 | Lavoie | ................... | B62D 13/06 |
| | | | | | 701/42 |

FOREIGN PATENT DOCUMENTS

| DE | 102005043470 A1 | 3/2007 |
|---|---|---|
| EP | 1695888 A2 | 8/2006 |
| GB | 2482384 A | 2/2012 |

OTHER PUBLICATIONS

International Preliminary Report on Patentability Mar. 19, 2015) for corresponding International App. PCT/SE2012/000199.
European Search Report (Jul. 15, 2016) for corresponding European App. EP 12 889 830.1.

* cited by examiner

METHOD FOR DETERMINING A MAXIMUM SPEED LIMIT FOR A REVERSING VEHICLE COMBINATION

BACKGROUND AND SUMMARY

The present invention relates to a method for determining a maximum speed limit for a reversing vehicle combination. The method is especially suited for use with a reverse assistance function.

Professional drivers of heavy trucks with trailers often have to perform low speed manoeuvres with high precision when marshalling. This could for example be when loading or loading the vehicle, docking at loading bays, parking in tight spaces, coupling trailers or changing swap bodies. When marshalling with a long vehicle combinations, even an experienced driver must be concentrated, and it may well be both stressful and time consuming.

One way to relieve the pressure on the driver when marshalling is to provide the truck with a reverse assistance function. The reverse assistance function will assist the driver when reversing the vehicle combination, thereby allowing the driver to supervise the manoeuvre. The reverse assistance will reduce the time spent during marshalling, e.g. the time spent to dock a loading platform, which will increase the productivity of the vehicle and the precision of the docking operation. Further, it may also reduce accidents that could damage both the vehicle combination and surrounding objects since the driver can be fully concentrated on supervising the vehicle motion rather than planning and executing the reversing of the vehicle combination. Another advantage is that also inexperienced drivers will be able to perform difficult marshalling tasks.

Reverse assistance is becoming increasingly popular by passenger cars, where the control task of the reverse assistant function often uses separate controllers for the steering and for the speed. The driver of the vehicle may e.g. control the reverse speed of the vehicle and the control system of the vehicle controls the steering of the vehicle when parallel parking. The system comprises some sort of speed limit such that the driver can only move the vehicle at a very low speed regardless of how much the throttle is engaged.

For a reverse assistance system that is to be used with a heavy vehicle such as a truck, other features are desirable. With a heavy vehicle, parallel parking is not a primary purpose. Instead, reversing over longer distances, e.g. for docking to a loading platform, is a useful feature. Further, the reverse assistance system should also be adapted to handle a vehicle combination comprising a truck and a trailer.

Also for such a system, it is of advantage to limit the speed of the vehicle combination in order to increase the safety and comfort. It is thus room for an improved method adapted to determine a maximum speed limit for a reversing vehicle combination.

It is desirable to provide an improved method for determining a maximum speed limit for a reversing vehicle combination. It is also desirable to provide a method for determining a maximum speed profile for a reversing vehicle combination.

In a method for determining a maximum speed limit for a reversing vehicle combination comprising a towing vehicle and at least one towed trailer, the steps of determining a manoeuvre that is to be performed by the vehicle combination, simulating the complete manoeuvre in advance by using a control algorithm and a state space model, thereby obtaining the steering behaviour of the vehicle combination during the manoeuvre, and calculating the maximum speed limit for the vehicle combination during the manoeuvre by using at least one predefined limiting condition are comprised.

By this first embodiment of the method, the method can determine a maximum speed limit for a vehicle combination during an assisted reverse manoeuvre. The speed limit is calculated by using one or more limiting conditions for the vehicle and/or for the driver. The limiting conditions may comprise the maximum steering rate of the steering actuator of the towing vehicle, the maximum braking capacity of the vehicle combination and comfort limitations for the driver. The maximum steering rate of the steering actuator is one important factor due to the fact that, if the steering actuator is too slow for the actual vehicle speed, the vehicle will deviate from the predefined track. In such a case, the vehicle may not reach the predefined position or it may drive in to obstacles positioned outside of the planned path. It is thus of advantage to simulate the manoeuvre in advance, taking account to different limiting conditions that may occur during the manoeuvre. The steering rate of the steering actuator will affect the maximum speed more or less depending on the sharpness of the turns that is to be made during the path. During a sharp turn, or when the desired curvature changes rapidly, the actuator rate will limit the allowed speed for the vehicle in order to stay on the predefined track. When the vehicle travels along a more or less constant straight or curved path, the actuator rate will probably not limit the allowed speed.

The braking capacity of the vehicle combination can also affect the maximum allowed speed of the vehicle combination. This limitation will affect the comfort of the driver and/or the forces imposed on the load of the vehicle combination. Another limiting condition that will affect the comfort of the driver and/or the load is e.g. the lateral acceleration.

In a development of the method, the manoeuvre of the vehicle combination is divided into several sub-paths, where a maximum speed limit is determined for each sub-path. In this way, a maximum speed profile for the manoeuvre is obtained. The actual speed of the vehicle combination during reversing can in this case be adapted to the type of manoeuvre and to the specific conditions during the manoeuvre. At a sharp turn, the speed limit is relatively low and may e.g. depend on the steering actuator rate, and at a straight segment, the speed may be limited by an upper speed limit.

The oeuvre that is to be performed may be selected from a list of stored manoeuvre paths. Such manoeuvres may be e.g., docking to a loading ramp, picking up a swap body that was previously delivered, parking in a parking space or reversing a path just travelled. Due to the type of manoeuvre, the path may be divided into several different sub-paths. Each sub-path may be defined as a path segment in which the steering of the towing vehicle displays the same sign. In this way, each change of direction will define a new sub-path. A sub-path may also be defined by a predetermined time interval or a predefined travelled distance.

BRIEF DESCRIPTION OF DRAWINGS

The invention will be described in greater detail in the following, with reference to the attached drawings, in which.

DETAILED DESCRIPTION

The embodiments of the invention with further developments described in the following are to be regarded only as examples and are in no way to limit the scope of the protection provided by the patent claims.

Figure 1:
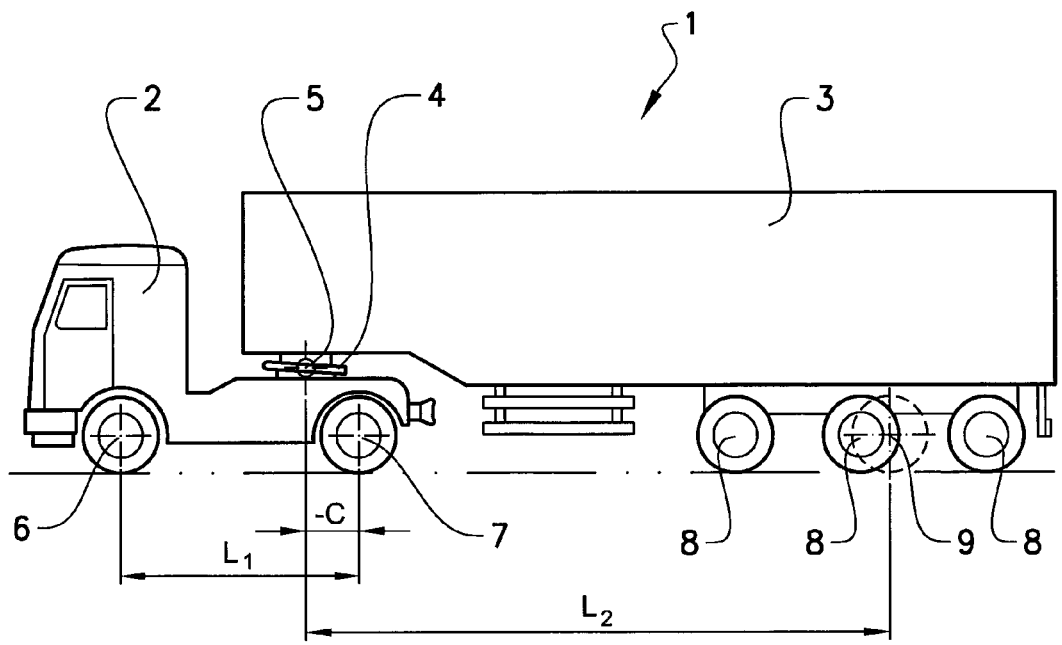
FIG. 1 shows a schematic vehicle combination comprising a towing vehicle and a towed vehicle.

FIG. 1 shows a schematic vehicle combination 1 comprising a towing vehicle 2 and a towed vehicle 3. The towing vehicle may be a regular truck adapted for commercial highway use, a bus or a tractor having a fifth wheel. In the shown example, a tractor having a fifth wheel is used as a towing vehicle. The towed vehicle 3 is in the shown example a semitrailer, but the towed vehicle may also be a regular trailer or a dolly. The semitrailer is provided with a kingpin that is connected to the fifth wheel of the tractor. This example shows a common type of a vehicle combination, but it is also possible to use a vehicle combination having other types of towing vehicles and other types and numbers of towed vehicles. One such example is a vehicle combination comprising a truck, a dolly and a semitrailer.

The towing vehicle is provided with an automatic reverse assistance function, in which the steering of the vehicle combination is automated during reversing and where the speed of the vehicle combination is controlled by the driver. The automatic reverse assistance function is adapted to steer the vehicle through a desired manoeuvre which consists of or comprises a predefined path which the vehicle should follow. The predefined path is selected such that is allows the vehicle to reach its final destination in a safe way, avoiding obstacles along the path.

Figure 2:
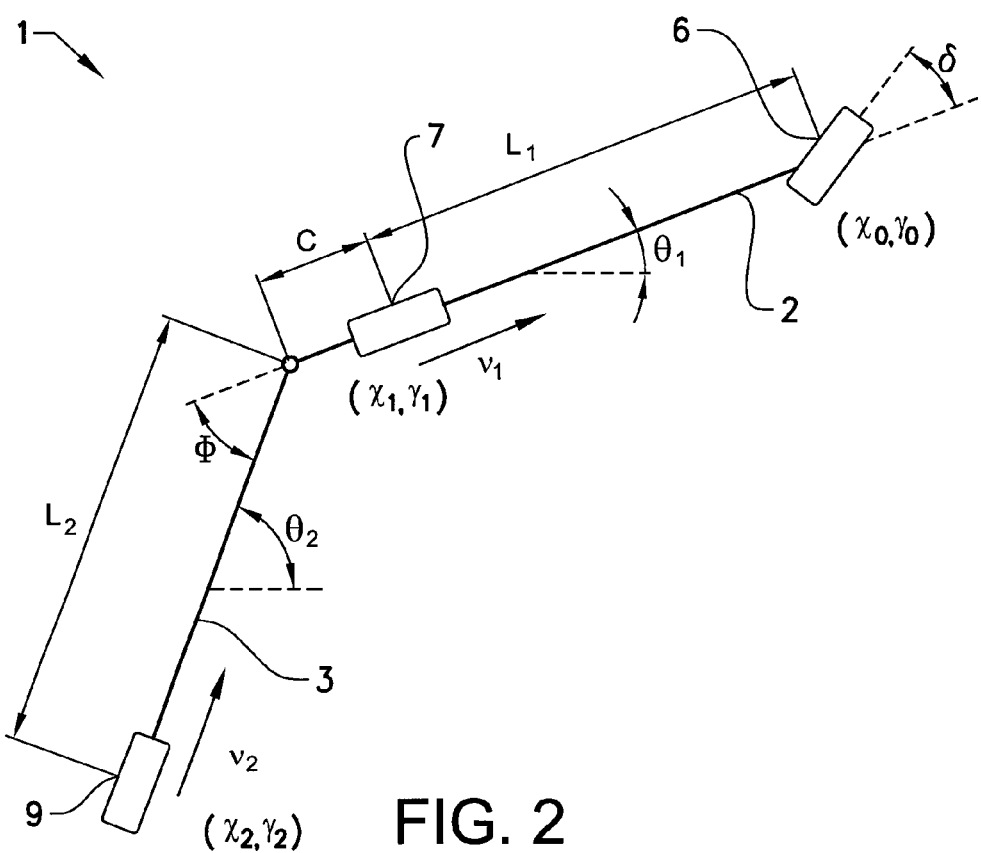
FIG. 2 shows an example of a kinematic vehicle model.

In FIG. 2, a kinematic vehicle model of a tractor-semitrailer vehicle combination is shown. The vehicle combination contains two rigid bodies attached by a joint which has one rotational degree of freedom.

In the figures, $L_x$ is the wheel base of the towing vehicle, in this example a tractor having one rear axle 7. This value may be the actual wheel base for a tractor having only two axles, or may be the effective wheel base for a tractor having more than two axles. The wheel base L is the distance between the front axle 6 and the rear axle 7 of the tractor. The distance between the rear axle and the connection point to the towed vehicle is denoted C. The tractor is provided with a fifth wheel 4 which connects to a king pin 5 provided on the semitrailer, which makes up the connection point between the tractor and the semitrailer. $L_2$ is the wheel base of the towed vehicle, in this example a semitrailer having three rear axles 8. This value ma be the actual wheel base for a semitrailer having one rear axle, but is normally the effective wheel base defined as the distance between the connection point and the virtual rear axle 9 of the semitrailer, since most semitrailers are provided with two or three rear wheel axles.

The algorithm for determining the maximum speed is in this example described for a tractor-semitrailer combination. However, any vehicle combination can be used with the described method.

A kinematic model of the vehicle is developed.

$$\dot{x}_2 = v_1\cos\phi\left(1 - \frac{c}{L_1}\tan\phi\tan\delta\right)\cos\theta_2$$

-continued $$\dot{y}_2 = v_1\cos\phi\left(1 - \frac{c}{L_1}\tan\phi\tan\delta\right)\sin\theta_2$$

$$\dot{\theta}_2 = -v_1\frac{1}{L_1 L_2}(L_1\sin\phi + C\cos\phi\tan\delta)$$

$$\dot{\phi} = -v_1\frac{1}{L_1 L_2}(L_2\tan\delta + L_1\sin\phi + C\cos\phi\tan\delta)$$

where $(x_2, y_2)$ is the coordinate of the semitrailer axle, $\theta_2$ is the heading of the trailer, $\phi_2$ is the articulation angle, $\delta$ is the steering angle and v is the speed of the tractor. The geometry is described by the wheelbase $L_1$ of the truck, the wheelbase $L_2$ of the trailer and the coupling position C. The equations above are time dependent. However, they may be rewritten to a time independent form.

$$\frac{\partial x_2}{\partial s} = \cos\theta_2$$

$$\frac{\partial y_2}{\partial s} = \sin\theta_2$$

$$\frac{\partial \theta_2}{\partial s} = -\frac{(L_1\tan\phi + C\tan\delta)}{L_1 L_2 - CL_2\tan\delta\tan\phi}$$

$$\frac{\partial \phi}{\partial s} = -\frac{(L_1\tan\phi + L_2\sec\phi + C\tan\delta)}{L_1 L_2 - CL_2\tan\delta\tan\phi}$$

where s is the distance travelled along the path.

Since the equations of motion are independent of time, it is possible to predict how the vehicle will behave during the manoeuvre before the travel has started. For a time dependent case, it is not possible to predict the behaviour in advance since the speed is not known beforehand when the driver is in control of the speed. Before the vehicle starts travelling, the complete manoeuvre is simulated with the control algorithm that is to be used during the manoeuvre and a state space model of the vehicle combination. The control algorithm takes account of the offset from the desired path and adjusts the steering angle in order to minimize the offset. In this way, the steering of the vehicle is known before the manoeuvre is performed. The output of the simulation is the vehicle state $(x_2, y_2, \theta_2, \phi)$ and input $\delta$ as a function of s, which describes how they will change along the desired path.

The simulation of the vehicle can be used to determine a maximum speed limit depending on one or more predefined conditions. In one example, the properties of the steering actuator are used as limiting condition of the truck. The actuators of the vehicle are naturally limited in how fast they can realise a motion change, and this is also the case for the steering actuator. The steering angle $\delta$ in the equations above, valid for an actively steered axle, has a maximum rate at which it can change. This maximum rate is $\dot{\delta}_{max}$. The maximum allowed speed for the vehicle with respect to this actuator limitation can be found from the equation $$v_{2,max} = \frac{\dot{\delta}_{max}}{\frac{\partial \delta}{\partial s}}$$

where $$\frac{\partial \delta}{\partial s}$$

is found by differentiating δ found in the simulation. From this, the maximum speed of the drive axle $v_1$ is obtained through the equation $$v_2 = v_1 \cos\phi \left(1 - \frac{C}{L_1} \tan\phi \tan\delta\right)$$

This gives a value for the maximum speed that the vehicle can travel with when cornering using the steering actuator and staying on the predefined path. With a higher speed, the steering will not be able to perform the required steering for the predefined path, which will result in that the vehicle will deviate from the predefined path. If the vehicle deviates from the predefined path, subsequent manoeuvres may also be of track, which may lead to that the vehicle reaches a wrong end position. A deviation from the predefined path may also be possible to compensate for, such that the vehicle still can reach the proper end position. However, a deviation along the predefined path may lead to a collision with an obstacle that is positioned outside of the predefined path. It is thus an advantage to adapt the reversing speed to the rate of the steering actuator.

In another example, the braking capacity is used as limiting condition. The maximum deceleration of the vehicle combination is limited by the braking capacity of the vehicle combination. Since the vehicle combination should stop at the end position of the path, the speed must start to decrease some distance before the end position. The maximum deceleration is $\alpha_{max}$. The maximum speed of the vehicle combination, with respect to brake actuator limitations, is in this example limited to satisfy the deceleration limit. The maximum deceleration may be set either from the maximum brake capacity of the vehicle combination, or from the maximum deceleration allowed for a specific load. The maximum deceleration for a vehicle combination transporting a liquid, such as a petrol truck, may e.g. differ from the maximum deceleration allowed for a vehicle combination transporting concrete blocks. This maximum deceleration value can thus be used to set the maximum speed limit of the vehicle combination when reversing.

The maximum deceleration can also be determined with regards to the comfort of the driver. Braking hard when reversing can be uncomfortable for the driver. Therefore, the maximum allowed deceleration can be set with respect not only to the actual braking capacity, but to the comfort of the driver. This comfort level of deceleration is most often lower than what the vehicle combination can deliver.

It is also possible to limit the maximum speed of the vehicle combination when there are no physical bounds due to actuator limitation, in order to give the driver time to supervise the reversing action. It is therefore of advantage to set a fix maximum speed that may not be exceeded at any time of the manoeuvre, regardless of other conditions. Depending on the other conditions, this fixed maximum speed may be overridden by another lower determined speed limit, e.g. depending on the steering actuator rate.

In another example, it is also possible to limit the speed in sharp turns, in order to limit the lateral forces experienced by the driver and/or imposed on the load. This maximum lateral acceleration is $\alpha_{lat,max}$. The simulation gives values for φ, δ and $$\frac{\partial \delta}{\partial s}$$

along the path. From this, the maximum speed $v_1(s)$ is given by the solution to the differential equation $$a_{lat,max} = \frac{\partial v_1}{\partial s} v_1 \cos\phi \left(1 - \frac{C}{L_1} \tan\phi \tan\delta\right) \tan\delta + v_1^2 \left(\cos\phi \left(1 - \frac{C}{L_1} \tan\phi \tan\delta\right) \frac{1}{\cos^2\delta} \frac{\partial \delta}{\partial s} + \frac{\tan\delta}{L_1}\right)$$

using the boundary condition $v_1(s_{final})=0$, i.e. the vehicle is going to stop at the end of the path. In this example, it is assumed that the vehicle always stays on the path, which gives that $$\frac{ds}{dt} = v_2.$$

In this way, a maximum speed limit for the vehicle can be determined during a reverse assistance manoeuvre. If the manoeuvre is relatively short or does not comprise any sharp turns, it may suffice with one maximum speed limit that is used for the complete manoeuvre. However, for longer manoeuvres, it is unpractical to use one maximum speed limit for the complete manoeuvre, since the maximum speed limit will be set by the lowest determined speed limit value. If e.g. a sharp turn is comprised, the maximum speed limit will be set by the speed through the sharp turn. Since this speed limit may be very low, it will be unpractical to use the same speed limit for reversing along a straight path.

The manoeuvre may thus be divided in several sub-paths, where a maximum speed limit is determined for each sub-path. In this way, a maximum speed limit for a sharp turn is used to limit the speed through this sharp turn, and another speed limit is used to limit the speed when reversing along a straight path. For some sub-paths, the steering actuator rate may be the limiting condition, and for other sub-paths, the comfort of the driver may be the limiting condition. The different determined maximum speed limits make up a maximum speed profile for the manoeuvre.

A sub-path may be defined and delimited in different ways. In one example, a sub-path is defined as a path segment in which the steering angle has the same sign. This means that when the steering wheels are directed in the same direction with regards to the centre line of the vehicle, a sub-path is defined. When the steering wheels changes direction, e.g. from turning right to turning left, a new sub-path is defined. In another example, a sub-path is defined by a predefined time interval. It is also possible to define a sub-path by a predefined distance value.

It is also possible to assign a maximum speed value to each simulation point, such that a continuous maximum speed profile is obtained for the complete manoeuvre. This can be seen as using a very high number of sub-paths defined by the same time or distance interval length. By using a continuous speed profile for the complete manoeuvre, a high degree of comfort can be obtained. Further, the manoeuvre can be performed with the highest possible speed in a secure way.

It is thus possible to determine a maximum speed limit or speed profile based on predefined limiting conditions of the vehicle, the vehicle combination and/or the driver. In addition to limiting the speed to these pre-calculated values, it is also possible to measure actual values during the actual reversing of the vehicle combination, e.g. to measure the actual steering actuator rate and the actual lateral acceleration during the manoeuvre. If the maximum values of the measured units, $5_{max}$ and/or $a_{latiTnax}$ are exceeded, the speed can be dynamically decreased during the manoeuvre. In this way, the determined maximum speed limit can be overridden by the actual measured values, should e.g. the load on the vehicle combination cause the vehicle combination to behave in a different way than expected.

Figure 3:
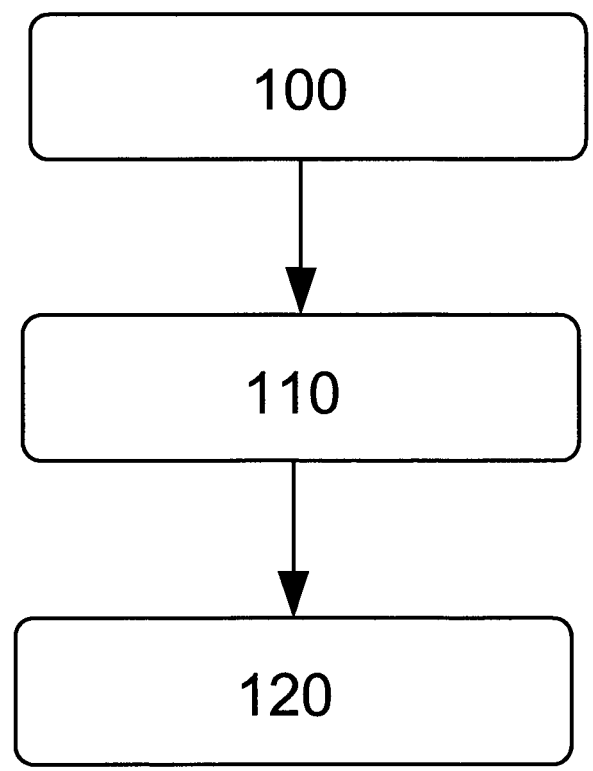
FIG. 3 shows a schematic flow chart of an inventive method for determining a maximum speed limit for a reversing vehicle combination.

FIG. 3 shows a schematic flow chart of the method for determining a maximum speed limit for a reversing vehicle combination comprising a towing vehicle and at least one towed trailer. The method is performed before the actual reversing of the vehicle combination is started.

In step 100, a manoeuvre that is to be performed by the vehicle combination is determined. The manoeuvre may e.g. be selected from a list of stored manoeuvres previously performed by the vehicle combination or by another vehicle combination. It would also be possible to set an end point on a map and to obtain a suggested path between the present position and the end position.

In step 110, the complete manoeuvre is simulated in advance by using a control algorithm and a state space model, such that the steering behaviour of the vehicle combination during the manoeuvre is obtained.

In step 120, the maximum speed limit for the vehicle combination during the manoeuvre is calculated by using at least one predefined limiting condition of the vehicle, the vehicle combination or the driver. The limiting condition may be the properties of one or more actuators of the vehicle, such as the steering actuator or the brake actuators, allowed stress on the load or comfort properties of the driver.

The complete manoeuvre may be divided in several sub-paths in order to determine different maximum speed limits for different parts of the path to be travelled. The method may thus be repeated for each sub-path.

The invention is not to be regarded as being limited to the embodiments described above, a number of additional variants and modifications being possible within the scope of the subsequent patent claims.

REFERENCE SIGNS

1: Vehicle combination
2: Truck
3: Semitrailer
4: Fifth wheel
5: King pin
6: Tractor front axle
7: Tractor rear axle
8: Semitrailer rear axle
9: Semitrailer virtual rear axle

The invention claimed is:

1. A method for determining a maximum speed limit for a reversing vehicle combination comprising a towing vehicle and at least one towed trailer, where the towing vehicle is provided with an automatic reverse assistance function, comprising:
   determining a manoeuvre that is to be performed by the vehicle combination, where the manoeuvre consists of a predefined path determined in advance prior to initiating the manoeuvre such that the vehicle will avoid obstacles when reversing,
   simulating the complete manoeuvre in advance prior to initiating the manoeuvre by using a control algorithm and a state space model, thereby obtaining the steering behaviour of the vehicle combination during the manoeuvre,
   calculating the maximum speed limit for the vehicle combination during the manoeuvre by using at least one predefined limiting condition, using the simulation of the complete manoeuvre, and
   controlling a vehicle speed with a non-transitory controller in accordance with the calculated maximum speed during the manoeuvre.

2. Method according to claim 1, wherein the manoeuvre is divided into sub-paths, and that a maximum speed limit is calculated for each sub-path, such that a maximum speed profile is obtained for the complete manoeuvre.

3. Method according to claim 2, wherein each sub-path is defined as a path segment in which the steering angle has the same sign.

4. Method according to claim 2, wherein each sub-path is defined by a predefined time interval.

5. Method according to claim 2, wherein each sub-path is defined by a predefined distance.

6. Method according to claim 1, wherein the each simulation point is assigned a maximum speed value, such that a continuous maximum speed profile is obtained for the complete manoeuvre.

7. Method according to claim 1, wherein the limiting condition is the properties of the steering actuator of the towing vehicle.

8. Method according to claim 1, wherein the limiting condition is the braking capacity of the vehicle combination.

9. Method according to claim 1, wherein the limiting condition is a measure corresponding to a comfort level of the driver.

10. Method according to claim 9, wherein the limiting condition is the lateral acceleration of the cab of the towing vehicle.

11. Method according to claim 1, wherein the maximum allowed speed during the manoeuvre is limited by a predefined set speed limit.

12. Method according to claim 1, wherein the manoeuvre that is to be performed is selected from a number of stored manoeuvres.

13. Method according to claim 1, wherein the calculated speed limit is used as an upper limit speed value for a reverse assistance function in which the driver controls the speed.

14. A method for determining a maximum speed limit for a reversing vehicle combination comprising a towing vehicle and at least one towed trailer, where the towing vehicle is provided with an automatic reverse assistance function, comprising:
   determining a manoeuvre that is to be performed by the vehicle combination, where the manoeuvre consists of a predefined path determined in advance prior to initiating the manoeuvre such that the vehicle will avoid obstacles when reversing,
   simulating the complete manoeuvre in advance prior to initiating the manoeuvre by using a control algorithm and a state space model, thereby obtaining the steering behaviour of the vehicle combination during the manoeuvre,
   calculating the maximum speed limit for the vehicle combination during the manoeuvre by using at least one predefined limiting condition, using the simulation of the complete manoeuvre, and informing a vehicle operator of the calculated maximum speed during the manoeuvre.

* * * * *